United States Patent
Mashima

(10) Patent No.: US 10,183,414 B2
(45) Date of Patent: Jan. 22, 2019

(54) METHOD OF PUNCHING OUT A DAMPER FROM A DAMPER MATERIAL HAVING A CONSTRAINT LAYER, PUNCHING APPARATUS USED FOR THE METHOD, AND ATTACHING APPARATUS WITH THE PUNCHING APPARATUS

(71) Applicant: NHK Spring Co., Ltd., Yokohama-shi, Kanagawa (JP)

(72) Inventor: Akio Mashima, Kanagawa (JP)

(73) Assignee: NHK Spring Co., Ltd., Kanagawa (JP)

( * ) Notice: Subject to any disclaimer, the term of this patent is extended or adjusted under 35 U.S.C. 154(b) by 204 days.

(21) Appl. No.: 14/154,388

(22) Filed: Jan. 14, 2014

(65) Prior Publication Data

US 2014/0216221 A1 Aug. 7, 2014

(30) Foreign Application Priority Data

Feb. 7, 2013 (JP) .................. 2013-022654

(51) Int. Cl.
| | |
|---|---|
| *B26F 1/14* | (2006.01) |
| *B26D 7/08* | (2006.01) |
| *B26D 7/18* | (2006.01) |
| *B26F 1/02* | (2006.01) |
| *B26F 1/38* | (2006.01) |
| *G11B 5/48* | (2006.01) |
| *B26F 1/00* | (2006.01) |

(52) U.S. Cl.
CPC ................ *B26F 1/14* (2013.01); *B26D 7/086* (2013.01); *B26D 7/1818* (2013.01); *B26F 1/02* (2013.01); *B26F 1/3846* (2013.01); *B26F 1/0084* (2013.01); *G11B 5/4833* (2013.01); *Y10T 83/04* (2015.04); *Y10T 83/2122* (2015.04); *Y10T 83/9425* (2015.04)

(58) Field of Classification Search
CPC .............. B26D 7/08; B26D 7/086; B26F 1/14
USPC ................... 83/557, 561, 658, 123–128, 956
See application file for complete search history.

(56) References Cited

U.S. PATENT DOCUMENTS

| | | | | |
|---|---|---|---|---|
| 3,312,134 | A | * | 4/1967 | Roney .................... B26D 7/086 83/349 |
| 3,494,396 | A | * | 2/1970 | Collins .................... B26D 1/24 144/162.1 |
| 3,700,150 | A | * | 10/1972 | Cheney .................. B21D 28/00 225/1 |

(Continued)

FOREIGN PATENT DOCUMENTS

| | | |
|---|---|---|
| JP | 8-132396 | 5/1996 |
| JP | 11-114896 A | 4/1999 |

(Continued)

*Primary Examiner* — Jason Daniel Prone
*Assistant Examiner* — Samuel A Davies
(74) *Attorney, Agent, or Firm* — Norris McLaughlin, P.A.

(57) ABSTRACT

A method punches out a damper from a damper material set on a punching stage with use of a hollow punch so that the punched damper is positioned within a hollow inside of the punch while vibrating a member composing the punching stage on which the damper material is set at the high frequency. The damper material includes a viscoelastic body layer and the constraint layer laminated on the viscoelastic body layer and the viscoelastic body layer includes an attaching surface through which the damper material is detachably attached on the liner.

8 Claims, 10 Drawing Sheets

(56) References Cited

U.S. PATENT DOCUMENTS

| | | | | |
|---|---|---|---|---|
| 6,095,023 | A * | 8/2000 | Harada | B26D 3/085 |
| | | | | 83/152 |
| 6,247,388 | B1 * | 6/2001 | Carter | B26D 1/385 |
| | | | | 310/316.01 |
| 2004/0149096 | A1 | 8/2004 | Ide et al. | |
| 2009/0126542 | A1 * | 5/2009 | Nonaka | B25J 15/04 |
| | | | | 83/43 |
| 2009/0183359 | A1 * | 7/2009 | Tsutsumi | G11B 5/4813 |
| | | | | 29/603.07 |

FOREIGN PATENT DOCUMENTS

| | | |
|---|---|---|
| JP | 2001-67635 | 3/2001 |
| JP | 2002-307382 A | 10/2002 |
| JP | 2009-176347 | 8/2009 |
| TW | 200421340 | 10/2004 |

\* cited by examiner

1 …

METHOD OF PUNCHING OUT A DAMPER FROM A DAMPER MATERIAL HAVING A CONSTRAINT LAYER, PUNCHING APPARATUS USED FOR THE METHOD, AND ATTACHING APPARATUS WITH THE PUNCHING APPARATUS

BACKGROUND OF THE INVENTION

1. Field of the Invention

The present invention relates to a method of punching a damper to be attached to an objective portion of, for example, a head suspension of a hard disk, to a punching apparatus used for the method and to an attaching apparatus with the punching apparatus.

2. Description of the Related Art

A hard disk drive has a disk and a head suspension for supporting a head. The head suspension allows the head to slightly float from the disk to read/write signals when the disk rotates at high speed. In such head suspension, data errors are likely to occur due to off tracks that are generated by turbulence (wind excitation), a natural vibration or the like at the time of the rotation of the disk.

To solve this problem, JP2001-067635A discloses a vibration damping technique that attaches a damper to a head suspension, the damper including a viscoelastic body layer and a constraint layer laminated on the viscoelastic body layer.

When the damper is attached to the head suspension, a damper material is prepared on an exfoliative member that is attached on the viscoelastic body layer side of the damper material in advance. Then, dampers are punched out from the damper material having a required shape one after another. The punched dampers are once aligned on a liner, and an attaching apparatus automatically or a worker with a pair of tweezers etc. manually picks them up to attach or stick on objective portions on the head suspensions, respectively.

In this regard, the applicant has proposed an automatically-attaching apparatus that automatically punches out and attaches a damper as JP2009-176347A.

The automatically-attaching apparatus is used for a damper material with a conventional constraint layer that is relatively thin and allows the damper to be punched out without cracks on the constraint layer.

Dampers, however, may have a thicker constraint layer to be applied to head suspensions as products in order to meet various requirements for head suspensions. In this case, the damper material also has a thicker constraint layer and involves a problem that the constraint layer of the punched damper cracks when punching out the damper from the damper material.

FIG. 12 is a magnified photograph showing a part of a cutting surface of a punched damper that is magnified 300 times, and FIG. 13 is a magnified photograph showing the same part that is magnified 500 times. As is apparent from FIGS. 12 and 13, there is a crack C in a thicker constraint layer.

FIGS. 14 and 15 are partial planar photographs showing a damper D with cracks that is stuck to an objective portion of a head suspension HS. In the photographs, whitened portions are the cracks C.

The cracks C occurred in this way affect the damping property of the damper to cause the deviation or bias in the damping characteristics of the head suspension. A solution is demanded for such cracks.

SUMMARY OF THE INVENTION

An object of the present invention is to provide a method of punching out a damper from a damper material having a constraint layer, a punching apparatus for the method and an attaching apparatus with the punching apparatus, capable of preventing the constraint layer of the punched damper from cracking due to the punching.

In order to accomplish the object, a first aspect of the present invention provides a method of punching out a damper from a damper material set on a punching stage with use of a hollow punch, the damper material including a viscoelastic body layer and a constraint layer laminated on the viscoelastic body layer, the viscoelastic body including an attaching surface through which the damper material is detachably attached on an exfoliative member. The method includes punching out the damper from the damper material so that the punched damper is positioned within a hollow inside of the punch while vibrating a member composing the punching stage on which the damper material is set at high frequency.

A second aspect of the present invention provides a punching apparatus used for the method according to the first aspect. The punching apparatus includes the punching stage, the hollow punch, and a vibrational part. The vibrational part is provided to the punching stage and serves as a counter part that is opposed to the punch, the vibrational part being vibrated at the high frequency at the time of punching out the damper.

A third aspect of the present invention provides an attaching apparatus having the punching apparatus according to the second aspect. In the attaching apparatus, the punch is movable from the punching stage to the objective portion of the head suspension and has an extruder that extrudes the damper held in the hollow inside to attach the extruded damper on the objective portion of the head suspension.

According to the first to third aspects, the member composing the punching stage or the vibrational part is vibrated at the high frequency at the time of punching out the damper, to prevent the constraint layer of the punched damper from cracking due to the punching.

BRIEF DESCRIPTION OF THE DRAWINGS

FIGS. 5A to 5C are side views in which FIG. 5A illustrates a punch, FIG. 5B illustrates an extruding pin, and FIG. 5C illustrates a state of use of the punch and the extruding pin according to the embodiment of the present invention;

DETAILED DESCRIPTION OF EMBODIMENTS

An embodiment according to the present invention will be explained. The embodiment vibrates a member composing a punching stage at radio frequency or high frequency when punching out a damper from a damper material set on the punching stage with use of a hollow punch, the damper material including a viscoelastic body layer and a constraint layer laminated on the viscoelastic body layer, the viscoelastic body including an attaching surface through which the damper material is detachably attached on an exfoliative member. This embodiment prevents the constraint layer of the punched damper from cracking due to the punching.

Preferably, a vibration direction of the member composing the punching stage is a direction along which the punch punches out the damper and a vibration amplitude of the member is less than a thickness of the exfoliative member.

The member that composes the punching stage to be vibrated at the high frequency may be a vibrational part separated from a main body of the punching stage and serving as a counter part that is opposed to the punch or be an integral part of the main body of the punching stage. In the latter case, the punching stage as itself is vibrated.

A punching method according to the embodiment is applied, for example, when holding the punched damper within a hollow inside of the punch and extruding the held damper to attach it to an objective portion of a head suspension.

The embodiment of the present invention will be explained in detail with reference to drawings.

Figure 1:
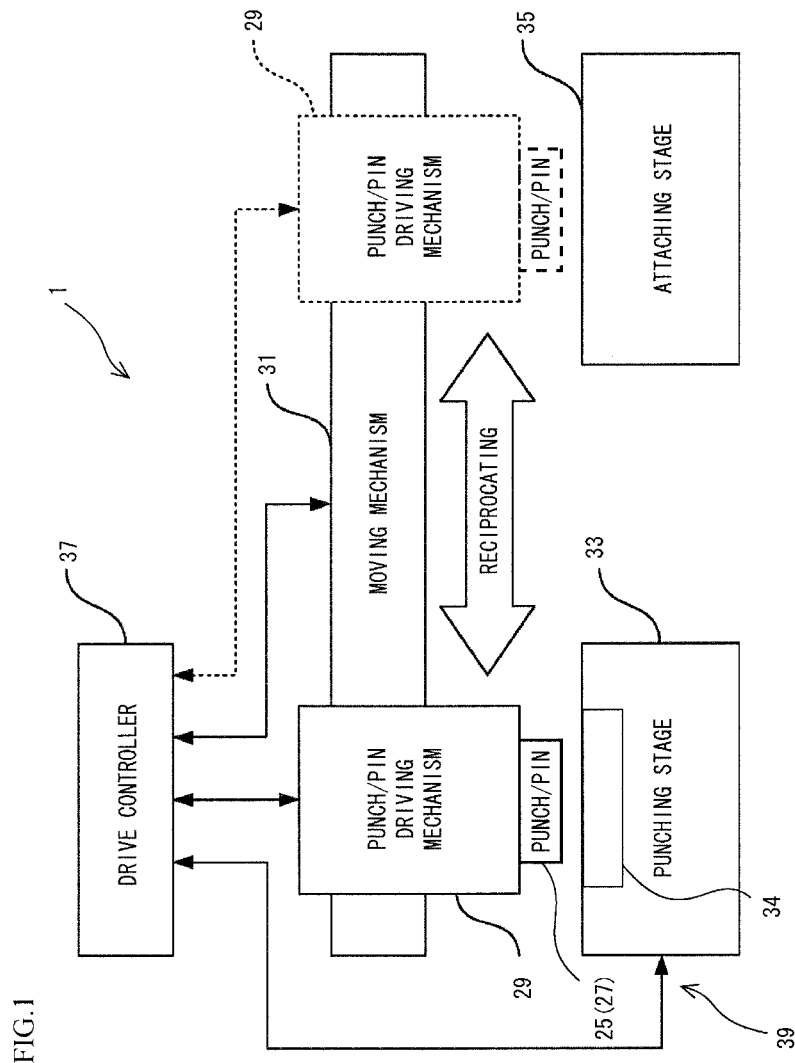
FIG. 1 is a block diagram schematically illustrating an attaching apparatus of a damper according to an embodiment of the present invention.
Figure 2:
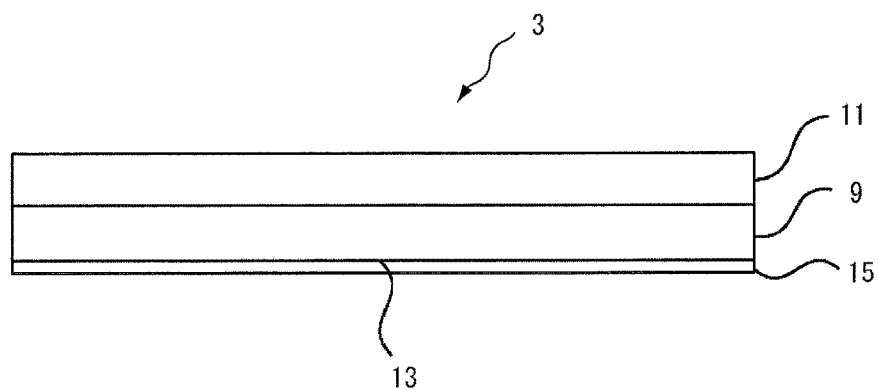
FIG. 2 is a side view illustrating a layered structure of a damper material according to the embodiment of the present invention.
Figure 3:
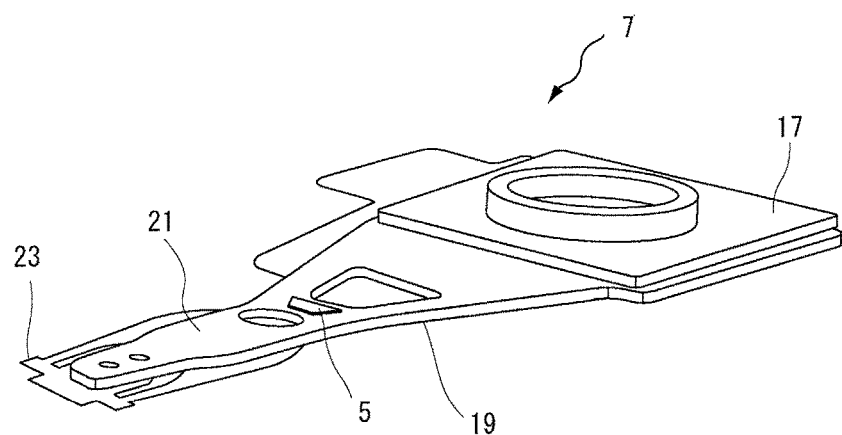
FIG. 3 is a perspective view schematically illustrating a head suspension on which a damper is attached according to the embodiment of the present invention.
Figure 4:
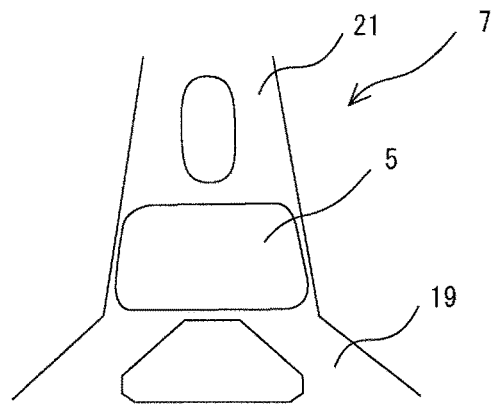
FIG. 4 is a partial plan view illustrating the head suspension, in particular a portion around the damper of FIG. 3.

FIG. 1 is a block diagram schematically illustrating an attaching apparatus 1 of a damper 5, FIG. 2 is a side view illustrating a layered structure of a damper material 3, FIG. 3 is a perspective view schematically illustrating a head suspension 7 on which the damper 5 is attached, and FIG. 4 is a partial plan view illustrating the head suspension 7, in particular a portion around the damper 5 of FIG. 3. FIGS. 3 and 4 indicate the same head suspension 7 with the damper 5, however, the head suspensions 7 in FIGS. 3 and 4 are indicated with slight differences.

According to the embodiment, the attaching apparatus 1 of FIG. 1 punches the damper 5 out from the damper material 3 as illustrated in FIG. 2 to hold the punched damper 5. The held damper 5 is attached or stuck to an objective portion of the head suspension 7 as illustrated in FIGS. 3 and 4.

The damper material 3 is an object to be punched and includes a viscoelastic body layer 9 made of adhesive compound and a constraint layer 11 integrated with and laminated on the viscoelastic body layer 9. The viscoelastic body layer 9 has a sticking surface or an attaching surface 13 opposite to the constraint layer 11. On the attaching surface 13, a flexible liner (separator) 15 that is a flexible exfoliative member is detachably attached or laminated to keep an adhesiveness of the attaching surface 13.

When using the damper 5, the liner 15 is detached from the attaching surface 13 of the damper 5. The attaching surface 13 is brought into close contact with the objective portion in order to attach the damper 5 to the objective portion. According to the embodiment, the liner 15 is detached from the attaching surface 13 at the time of punching out the damper 5.

As for a material of the viscoelastic body layer 9, it is preferred to use acrylic adhesive which is generally excellent in vibration damping properties and heat resistance, although not particularly limited. The thickness of the viscoelastic body layer 9 is usually preferred to be set to about 15 to 250 μm in view of vibration damping effect in the head suspension 7, although not limited in particular. According to the embodiment, the thickness of the viscoelastic body layer 9 is set about 50 μm.

As for a material of the constraint layer 11, a metal plate, plastic film or the like is suitably used for example, although not limited in particular. Particularly, it is preferred that the material has the elastic modulus according to JIS K7127 (Japanese Industrial Standards) more than 2.943 GN/m$^2$ (300 kg/mm$^2$ before conversion). This is because the vibration damping properties become better as the elastic modulus increases.

In the case of the constraint layer 11 made of metal plate, a stainless plate, an aluminum plate, a copper plate, a phosphor bronze plate, a beryllium copper plate or the like may be used, for example. In the case of the constraint layer 11 made of plastic film, polyimide resin, biaxial-oriented polyethylene terephthalate (PET), biaxial-oriented polypropylene, aramid resin, polyethylenenaphthalate (PEN) or the like may be used.

According to the embodiment, the constraint layer 11 is a PET plate having the thickness of about 125 μm. The thickness of the constraint layer 11 is thicker than a conventional thickness of about 50 μm that is the same as the thickness of the viscoelastic body layer 9 according to requirements for the head suspension 7. The thickness of the constraint layer 11, however, is not limited and may be thicker or thinner than about 125 μm or may be comparable with the conventional thickness. The thickness of the constraint layer 11 is preferably set to about 10 to 150 μm in the case of a metal plate and to about 20 to 200 μm in the case of a plastic film.

As for a material of the liner 15, it requires a good release property with respect to the viscoelastic body layer 9. For this purpose, although not limited in particular, the liner 15 has a tentatively laminated surface that is processed with non-silicone series release treating agent, the tentatively laminated surface attached to the attaching surface 13. The thickness of the liner 15 is not limited as long as the liner 15 functions as the exfoliative member. According to the embodiment, the thickness of the liner 15 is set to about 50 μm.

The head suspension 7 is an object on which the damper 5 is attached and supports a head to read/write signals. As illustrated in FIG. 3, the head suspension 7 includes a base plate 17, a resilient part 19, and a load beam 21 connected to the base plate 17 through the resilient part 19.

The load beam 21 supports a flexure 23 to which the head is attached and applies a load onto the head. The flexure 23 is fixed to the load beam 21 by, for example, spot welding. To the load beam 21, the damper 5 is attached or stuck to a portion in front of the resilient part 19 in a longitudinal direction of the head suspension 7 as illustrated in FIGS. 3 and 4.

The head suspension 7 and the damper 5 in FIGS. 3 and 4 are just one example of a head suspension and damper. The present invention is applicable to the other head suspensions and dampers with the other shapes. The damper 5 may be attached to the other portion of the head suspension 7.

As illustrated in FIG. 1, the attaching apparatus 1 includes a punch 25 and an extruding pin 27 (punch/pin in FIG. 1), a punch/pin driving mechanism 29, a moving mechanism 31, a punching stage 33, an attaching stage 35, and a drive controller 37. In the attaching apparatus 1 according to the embodiment, at least the punch 25 and the punching stage 33 (including a vibrational part 34) compose a punching apparatus 39 for the damper 5.

The punch 25 and extruding pin 27 are supported with the punch/pin driving mechanism 29 and are driven to perform punching operation and extruding operation, respectively. The punch 25 punches out the damper 5 as illustrated in FIGS. 3 and 4 from the damper material 3 of FIG. 2 and holds the punched damper 5 through the punching operation. The extruding pin 27 extrudes the held damper 5 from the punch 25 to allow the damper 5 to be attached on the objective portion through the extruding operation. The details of the punch 25 and extruding pin 27 will be explained later.

The moving mechanism 31 moves the punch/pin driving mechanism 29 so that the punch 25 reciprocates between the punching stage 33 and the attaching stage 35. With this, the moving mechanism 31 relatively moves the punch 25 from the punching stage 33 to the objective portion of the head suspension 7.

The punching stage 33 allows the punch 25 to punch out and hold the damper 5 thereon and the attaching stage 35 allows the punch 25 and extruding pin 27 to attach the damper 5 to the objective portion of the head suspension 7. The punching stage 33 has the vibrational part 34 serving as a counter part that is opposed to the punch 25. The vibrational part 34 is a member composing the punching stage 33 and separated from a main body of the punching stage 33. The vibrational part 34 is vibrated at radio frequency or high frequency at the time of punching out the damper 5 by the punch 25. The details of the punching stage 33, vibrational part 34, and the attaching stage 35 will be explained later.

The drive controller 37 is electrically connected to the punch/pin driving mechanism 29, the moving mechanism 31, the vibrational part 34 and the like to conduct drive control of them. Namely, the drive controller 37 drives the punch 25 through the punch/pin driving mechanism 29 to punch the damper 5 using the vibrational part 34 as the counter part or receiver with respect to the punch 25. At this time, the drive controller 37 conducts vibration control with respect to the vibrational part 34 based on a high frequency vibration such as ultrasonic vibration. Thereafter, the drive controller 37 relatively moves and positions the punch 25 to the objective portion through the moving mechanism 31. At the positioning state of the punch 25, the drive controller 37 drives the extruding pin 27 to extrude the damper 5 from the punch 25 through the punch/pin driving mechanism 29.

Under this drive control, the extruded damper 5 is attached or stuck to the objective portion of the head suspension 7.

Figure 5C:
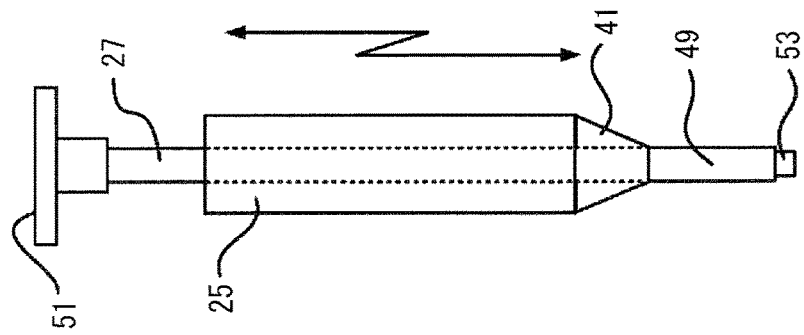
Figure 5B:
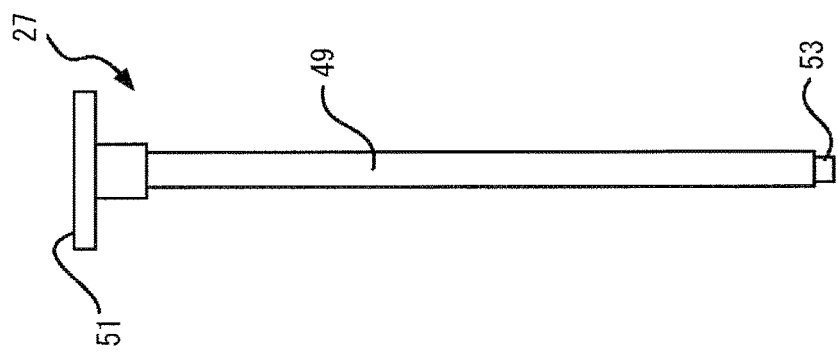
Figure 5A:
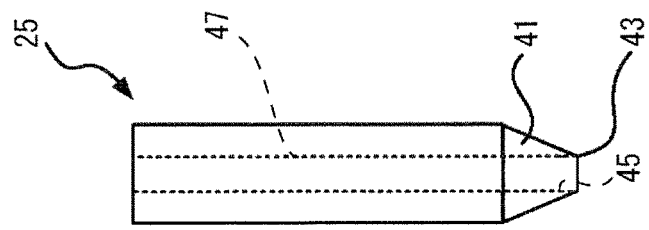

FIGS. 5A to 5C are side views in which FIG. 5A illustrates the punch 25, FIG. 5B illustrates the extruding pin 27, and FIG. 5C illustrates a state of use of the punch 25 and the extruding pin 27.

The punch 25 is made of, for example, metallic material such as stainless steel. The punch 25 is entirely hollow and extends along a punching direction. The punch 25 punches the damper 5 so that the punched damper 5 is positioned within a hollow inside of the punch 25.

The punch 25 has a front end portion 41 in the punching direction. The front end portion 41 includes a tapered outer surface that gradually thins the front end portion 41 toward a front end edge. The front end portion 41 has an opening defined by the front end edge and a tooth portion 43 at an opening edge that is the front end edge. The tooth portion 43 is sharpened by the thinning of the front end portion 41. According to the embodiment, an inner surface 45 of the front end portion 41 holds the damper 5 positioned within the hollow inside of the punch 25.

The damper 5, however, may be held within the hollow inside at the front end portion 41 by suction without relying on the inner surface 45 of the front end portion 41. Alternatively, the punch 25 may just punch out the damper 5 without holding the same so that the punched damper 5 is left on the liner 15. In this case, the punched damper 5 on the liner 15 is held by suction using a separate suction jig and then the suction jig is moved toward the attaching stage 35.

The inner surface 45 of the front end portion 41 according to the embodiment is polished through a smoothing process. The polished inner surface 45 allows the damper 5 to be smoothly and easily punched out and held by and extruded from the punch 25. The size of a punching area with the inner surface 45 is 3 mm square, although is not particularly limited.

The punch 25 includes the hollow inside 47 whose sectional shape corresponds to a planar shape of the damper 5. The extruding pin 27 is inserted into the hollow inside 47 of the punch 25. The extruding pin 27 serves as an extruder of the punching apparatus 39 and extrudes the damper 5 held by the inner surface 45 of the hollow punch 25 to attach the extruded damper 5 on the objective portion of the head suspension 7.

The extruding pin 27 is made of, for example, metallic material such as stainless steel and is formed into a rod as a whole. The extruding pin 27 extends along an extruding direction corresponding to the punching direction and is movable backward and forward along the hollow inside 47 in the extruding direction. With the forward movement, the extruding pin 27 extrudes the damper 5 from the punch 25. Instead of the extruding pin 27, an extruder may be configured to extrude the damper 5 by air pressure or the like. In a case where the damper 5 is held by suction using the separate suction jig, an extruder may be configured to release the damper 5 from the suction jig by canceling the suction, applying air pressure or the like.

The extruding pin 27 includes a shaft portion 49 whose sectional shape corresponds to the planar shape of the damper 5 similar to the hollow inside 47 of the punch 25. A first end of the shaft portion 49 in the extruding direction has a circular plate-like fitting portion 51 and a second end that is a front end portion of the shaft portion 49 has a small protrusion 53.

The small protrusion 53 expands a gap between the inner surface 45 of the front end portion 41 of the punch 25 and the outer peripheral surface of the front end portion of the extruding pin 27 to form an escaping space. The escaping space prevents the viscoelastic body layer 9 of the damper 5 from clinging to the inner surface 45 of the punch 25 when extruding the damper 5 that is punched out by and held on the inner surface 45 of the punch 25. This eliminates an obstacle with respect to the extrusion of the damper 5.

The extruding pin 27 is supported with the punch/pin driving mechanism 29 at the fitting portion 51 and the punch 25 is supported with the same at the rear end in the punching direction.

Therefore, the punch 25 and extruding pin 27 are driven by the punch/pin driving mechanism 29 to move backward and forward in the punching direction (extruding direction).

Figure 6:
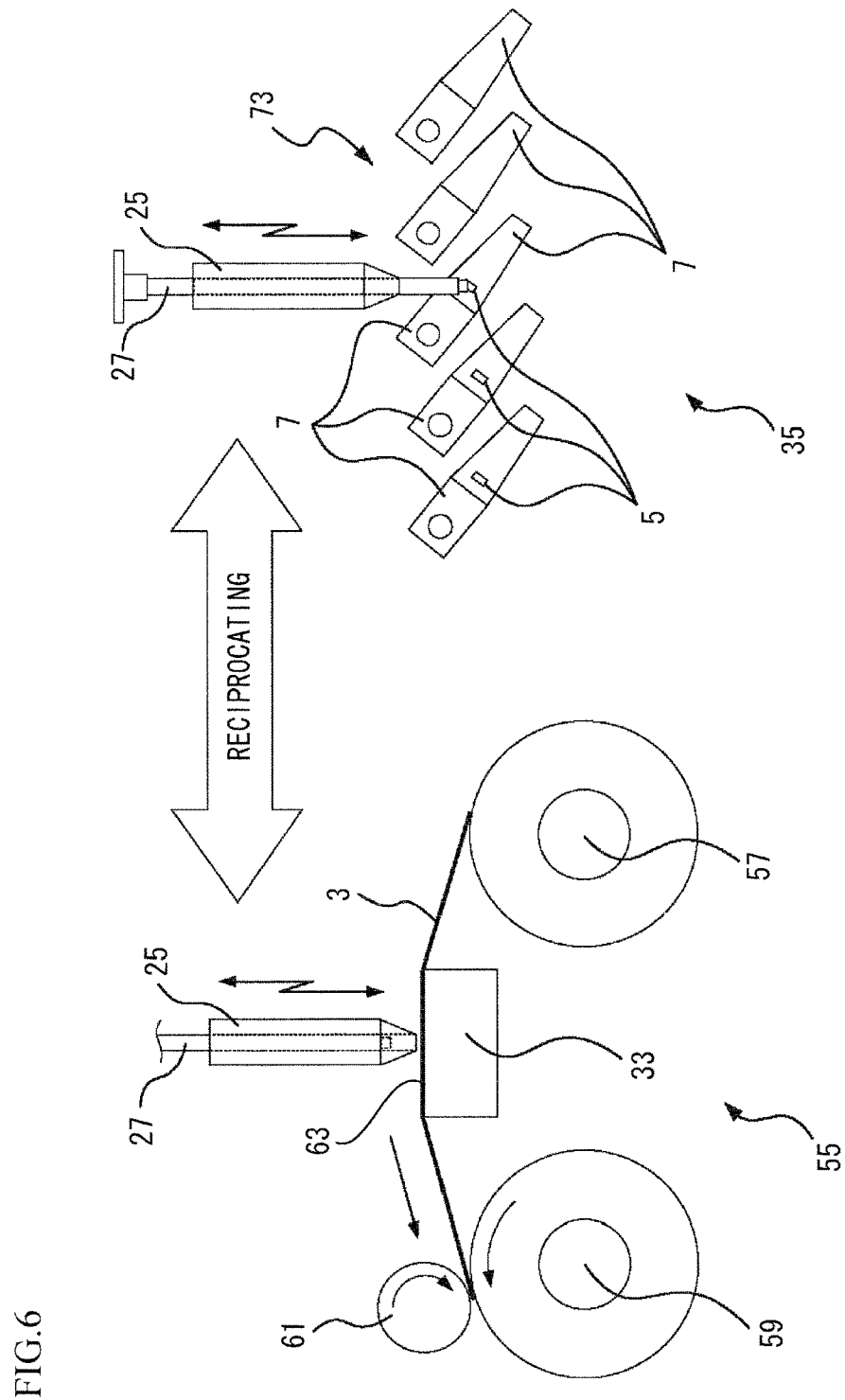
FIG. 6 is a schematic view illustrating a punching stage and an attaching stage of the attaching apparatus of FIG. 1.
Figure 7:
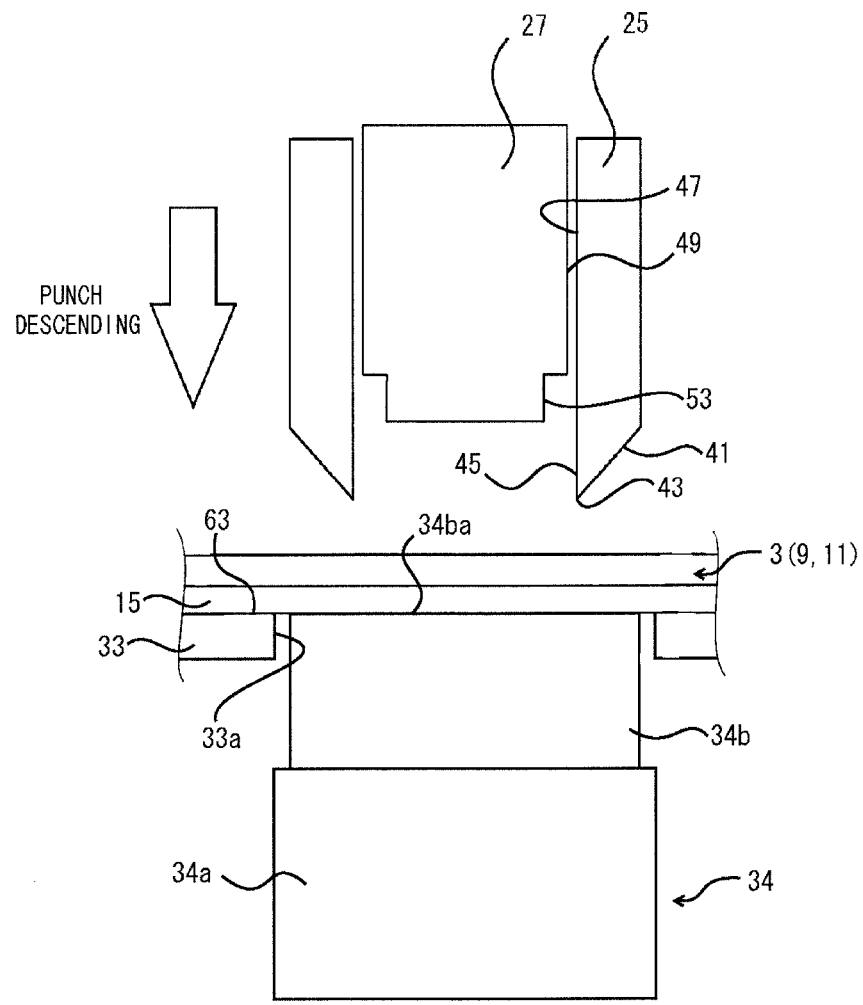
FIG. 7 is a partial sectional view schematically illustrating a punching apparatus in the attaching apparatus according to the embodiment of the present invention.
Figure 8:
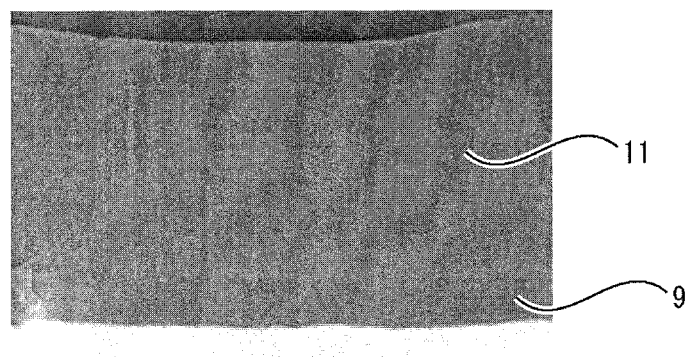
FIG. 8 is a magnified photograph showing a cross section of a constraint layer of a punched damper according to the embodiment of the present invention.

FIG. 6 is a schematic view illustrating the punching stage 33 and the attaching stage 35 of the attaching apparatus 1 of FIG. 1, FIG. 7 is a partial sectional view schematically illustrating the punching apparatus 39 in the attaching apparatus 1, and FIG. 8 is a magnified photograph showing a cross section of a constraint layer 11 of a punched damper 5. In FIG. 7, the damper material 3 is schematically illustrated with lack of the details as a combination of the viscoelastic body layer 9 and the constraint layer 11. The damper material 3 in FIG. 7 has the same structure as that in FIG. 2. The same holds for FIG. 9.

As illustrated in FIG. 6, the punching stage 33 is provided in a feeding unit 55 for the damper material 3. The feeding unit 55 includes a driven shaft 57 and a drive shaft 59. In the feeding unit 55, a roll of a band-shaped damper material 3 that is wound around a core (not illustrated) is set to the driven shaft 57.

An end of the band damper material 3 is fixed or engaged to the drive shaft 59. To an outer periphery of the drive shaft 59, a feed roller 61 is arranged to hold the damper material 3 together with the drive shaft 59. The feed roller 61 is controlled by the drive controller 37 to feed the damper material 3 by a predetermined length at a predetermined timing.

The punching stage 33 is positioned between the driven shaft 57 and the drive shaft 59. The punching stage 33 is formed into a rectangular block or plate and includes a supporting surface 63 for the damper material 3 as illustrated in FIGS. 6 and 7. The supporting surface 63 is defined by a top surface of the punching stage 33.

The punching stage 33 has a through hole 33a in a region facing the punch 25 in the punching direction. The vibrational part 34 is arranged in the through hole 33a so that the vibrational part 34 is allowed to be vibrated at the high frequency in the through hole 33a. The vibrational part 34 includes, for example, an ultrasonic transducer 34a and a horn 34b joined to the ultrasonic transducer 34a. An upper surface 34ba of the horn 34b is flush with the supporting surface 63.

The horn 34b is oscillated or vibrated by the ultrasonic transducer 34a. A vibration direction of the horn 34b is a thickness direction of the damper material 3 set on the upper surface 34ba, i.e., is the punching direction along which the punch 25 punches out the damper 5. A vibration frequency of the horn 34b is set according to the thickness of the damper material 3 or the like so that the constraint layer 11 does not crack due to the punching with use of the punch 25. The vibration frequency is determined through experimentation or the like in advance and is set to about 70 kHz within an ultrasonic range in this embodiment.

In this way, the horn 34b is directly vibrated at the high frequency or ultrasonic frequency. Instead, the horn 34b may be indirectly vibrated due to, for example, resonance.

A vibration amplitude of the horn 34b or the vibrational part 34, i.e., the member composing the punching stage 33 is less than the thickness of the liner 15 in this embodiment. Accordingly, the upper surface 34ba of the horn 34b never comes into contact with the punch 25 even if the punch 25 is stopped during the tooth portion 43 of the punch 25 cuts into the liner 15. This facilitates the punching-out of the damper 5.

The vibrational part 34 has a shape corresponding to a contour shape of the punched damper 5 according to the punch 25 or a shape corresponding to a size of the punch 25 and a width of the damper material 3. The vibrational part 34 is exchangeable according to a required contour shape of the punched damper 5 based on the punch 25, or according to the size of the punch 25 and the width of the damper material 3. The vibrational part 34, however, may not be exchangeable.

The vibrational part 34 is locally positioned in the punching stage 33 and the local vibrational part 34 allows output power of the ultrasonic transducer 34a to be reduced. The vibrational part 34 may be formed along the tooth portion 43 of the punch 25 to conduct the high-frequency vibration or ultrasonic vibration only around a cutting portion. Instead of the local vibrational part 34, the punching stage 33 may have an integral part of the main body of the punching stage 33, the integral part corresponding to the local vibrational part. In this case, the punching stage 33 is entirely vibrated.

The vibrational part 34 may be exchangeable according to a required vibration frequency as the member composing the punching stage 33 to be vibrated at the high frequency.

When the punch 25 punches out the damper 5, the damper material 3 is supported on the supporting surface 63 and the ultrasonic transducer 34a is driven at 70 kHz by the drive controller 37 to vibrate the horn 34b. A driving start timing of the ultrasonic transducer 34a through the drive controller 37 is not particularly limited and may be freely set. For example, the ultrasonic transducer 34a starts to generate the vibration at the time of bringing the tooth portion 43 of the punch 25 into contact with the constraint layer 11 of the damper material 3, starts to generate the vibration in synchronization with the driving of the punch 25, or always generates the vibration.

With the vibration of the horn 34b, the ultrasonic vibration is input to the damper material 3 on the upper surface 34ba in the thickness direction. The punch 25 punches out the damper 5 from the damper material 3 that is in the vibrating state.

Figure 13:
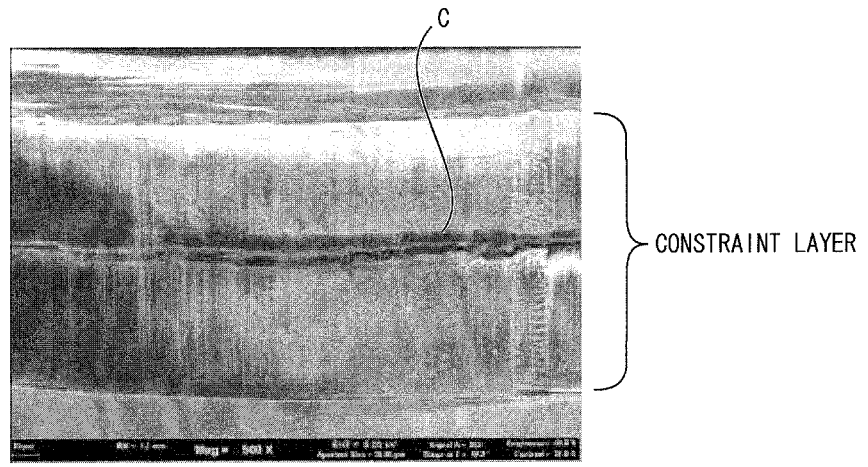
FIG. 13 is a magnified photograph showing a part of a cutting surface of a punched damper that is magnified 500 times according to the related art.
Figure 14:
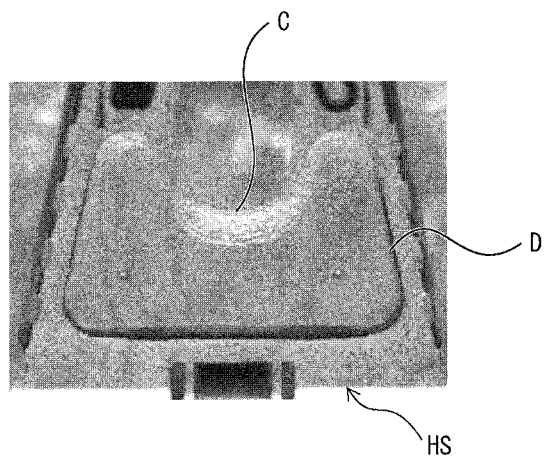
FIG. 14 is a photograph showing a damper with cracks on a constraint layer, the damper stuck to an objective portion of a head suspension according to the related art.
Figure 15:
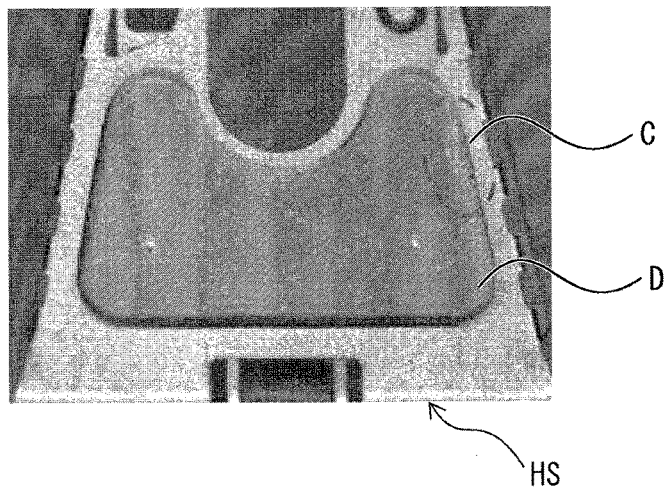
FIG. 15 is a photograph showing another damper with cracks on a constraint layer, the damper stuck to an objective portion of a head suspension according to the related art.

FIG. 8 shows the result of this punching-out. There is no cracks as occurred in the related art of FIG. 13 even if the constraint layer 11 is the PET plate with the thickness of about 125 μm.

The attaching stage 35 allows a chained article 73 including a plurality of chained head suspensions 7 to be set to a work clamp (not shown) and to be fixed with jigs.

In the attaching stage 35, the damper 5 is attached on the required objective portion of each head suspension 7 of the chained article 73.

A punching method according to the embodiment will be explained in an attaching process of the damper 5 conducted by the attaching apparatus 1.

Figure 9A:
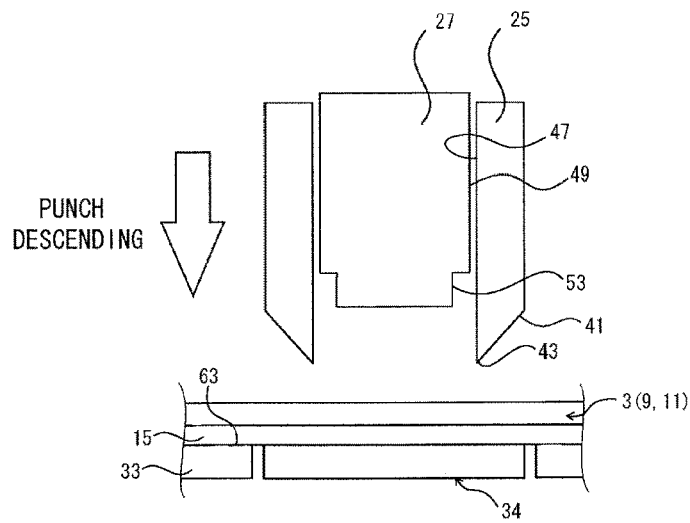
FIGS. 9A to 9C are explanatory views illustrating a punching method according to the embodiment of the present invention in chronological order.
Figure 9B:
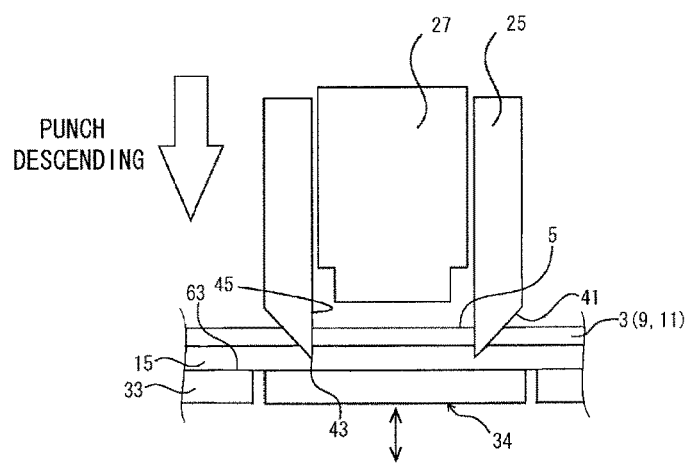
Figure 9C:
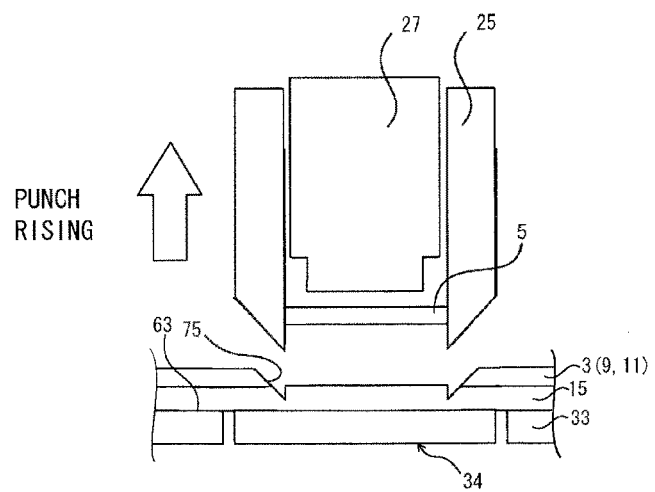
Figure 10:
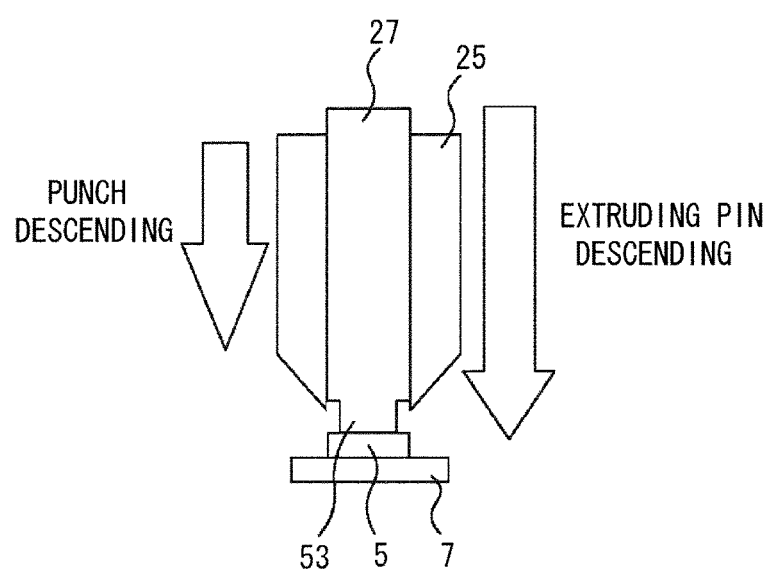
FIG. 10 is an explanatory view partly illustrating the attaching apparatus in a state of attaching the damper to the head suspension according to the embodiment of the present invention.

FIGS. 9A to 9C are explanatory views illustrating the punching method in chronological order, and FIG. 10 is an explanatory view partly illustrating the attaching apparatus 1 in a state of attaching the damper 5 to the head suspension 7.

As illustrated in FIGS. 9A to 9C, the attaching apparatus 1 punches the damper 5 out from the damper material 3 using the vibrational part 34, in particular the horn 34b, as the counter part or receiver with respect to the punch 25 through the punching operation.

Namely, as illustrated in FIG. 9A, the punch 25 is positioned with respect to the horn 34b of the vibrational part 34 over the punching stage 33. With the positioning, the contour of the horn 34b is positioned out of an edge of a portion on the damper material 3 to be punched out as the damper 5 by the punch 25.

In this state, as illustrated in FIG. 9B, the damper 5 is punched out and held by the punch 25. Namely, the punch 25 is driven to descend and move toward the punching stage 33 so that the tooth portion 43 at the front end of the punch 25 passes through the damper material 3 and bites or cuts into the liner 15 so as not to punch out the liner 15.

At this time, for example, the ultrasonic transducer 34a starts to generate the vibration to vibrate the horn 34b at the time of bringing the tooth portion 43 of the punch 25 into contact with the constraint layer 11 of the damper material 3 as mentioned above. With this, while a portion of the liner 15 corresponding to the vibrational part 34 is supported with the upper surface 34ba of the horn 34b, the tooth portion 43 of the punch 25 smoothly cuts into the constraint layer 11 of the damper material 3.

Additionally, the ultrasonic vibration input to a boundary between the liner 15 and the damper 5 promotes separation between the liner 15 and the damper 5.

Further, since the tooth portion 43 of the punch 25 bites the liner 15, this is easy to vibrate a surface of the liner that is in contact with the damper 5, thereby accelerating the promotion of the separation between the liner 15 and the damper 5. The tooth portion 43 of the punch 25 may not bite the liner 15. In this case, the liner 15 is just held between the tooth portion 43 and the horn 34b.

After the damper 5 is punched out by the punch 25 in this way, the punched damper 5 is held by the inner surface 45 of the punch 25 and is accurately separated from the liner 15. By punching out the damper 5, a punched hole 75 is formed on the damper material 3.

Figure 11:
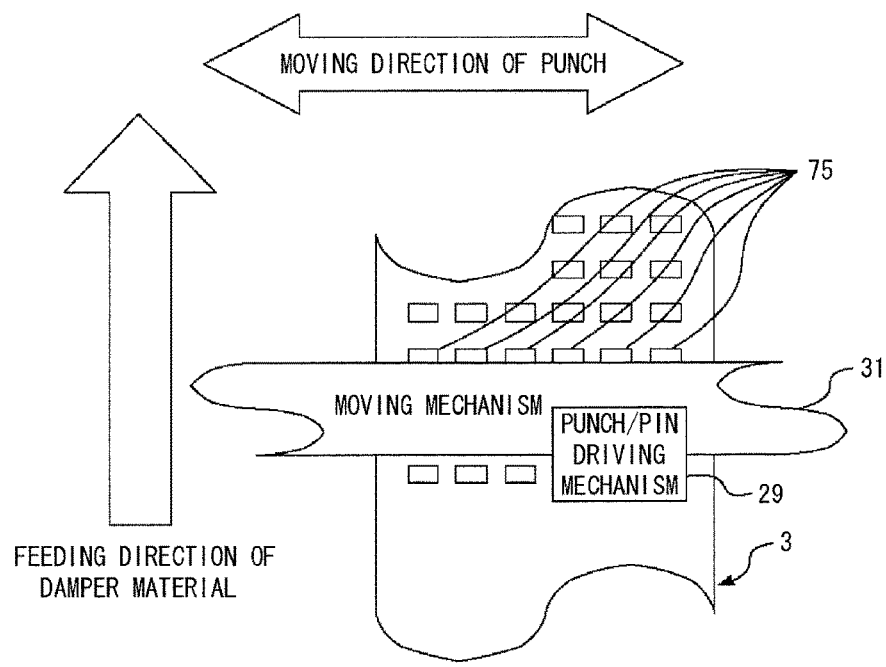
FIG. 11 is a partial plan view illustrating the attaching apparatus in a state of punching out the damper according to the embodiment of the present invention.
Figure 12:
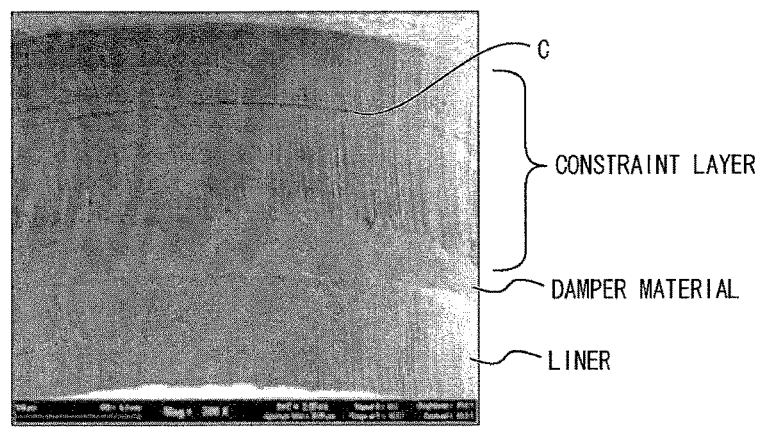
FIG. 12 is a magnified photograph showing a part of a cutting surface of a punched damper that is magnified 300 times according to a related art.

Such punching operation is repeated as illustrated in FIG. 11. The repeated punching operations of the punch 25 are successively conducted in the moving direction of the punch/pin driving mechanism 29 having the punch 25 while feeding the damper material 3. The moving direction of the punch/pin driving mechanism 29 or punch 25 is orthogonal to the feeding direction of the damper material 3.

With this, the attaching apparatus 1 punches out two or more dampers 5 along a widthwise direction of the band-shaped damper material 3. This results in a smooth work while improving the material yield.

In each punching operation, after holding the damper 5, the punch 25 raises and moves away from the vibrational part 34 as illustrated in FIG. 9C. Then, the punch 25 is positioned relative to the objective portion of the head suspension 7 that is on the attaching stage 35 as illustrated in FIG. 10.

In the positioning state, the attaching operation or extruding operation is carried out. Namely, the punch 25 descends toward the attaching stage 35 and then the extruding pin 27 inside the punch 25 descends toward the attaching stage 35. Therefore, the held damper 5 is extruded from the punch 25 and is attached on the objective portion of the head suspension 7.

The inner surface 45 of the front end portion 41 of the punch 25 is polished and smoothed through a smoothing process and the front end portion of the extruding pin 27 in the extruding direction is provided with the small protrusion 53. Therefore, it can prevent the viscoelastic body layer 9 of the damper 5 from clinging so that it eliminates an obstacle with respect to the extrusion of the damper 5.

Effect of the embodiment will be explained.

The embodiment provides the method of punching out the damper 5 from the damper material 3 set on the punching stage 33 with use of the hollow punch 25, the damper material 3 including the viscoelastic body layer 9 and the constraint layer 11 laminated on the viscoelastic body layer 9, the viscoelastic body layer 9 including the attaching surface through which the damper material 3 is detachably attached on the liner 15. The method punches out the damper 5 from the damper material 3 so that the punched damper 5 is positioned within the hollow inside of the punch 25 while vibrating the member composing the punching stage 33 on which the damper material 3 is set at the high frequency.

This method allows the tooth portion 43 of the punch 25 to move toward and cut into the constraint layer 11 of the damper material 3 that is in the vibrating state at the ultrasonic frequency, so that the tooth portion 43 smoothly cuts into the constraint layer 11. With this, the damper 5 is quickly punched out while preventing the constraint layer 11 of the punched damper 5, in particular the cutting surface, from cracking.

According to the embodiment, the vibration direction of the member composing the punching stage 33 is the punching direction along which the punch 25 punches out the damper 5. This prevents the vibrating damper material 3 from shifting with respect to the punch 25 and allows the punch 25 to accurately punch out the damper 5 even if the member composing the punching stage 33 is vibrated at the high frequency.

Further, the vibration amplitude of the member composing the punching stage 33 is less than the thickness of the liner 15.

Accordingly, the upper surface 34ba of the horn 34b that is the part of the aforementioned member composing the punching stage 33 never comes into contact with the punch 25 even if the punch 25 is stopped during the tooth portion 43 of the punch 25 cuts into the liner 15. This facilitates the punching-out of the damper 5.

The punching stage 33 includes the vibrational part 34 serving as the counter part that is opposed to the punch 25, and the vibrational part 34 is vibrated at the high frequency as the aforementioned member composing the punching stage 33.

This reduces output power of the ultrasonic transducer 34a of the vibrational part 34 compared with a case where the punching stage 33 is entirely vibrated, thereby saving energy.

The punch 25 holds the punched damper 5 within the hollow inside so that the held damper 5 is allowed to be extruded from the punch 25 and be attached to the objective portion of the head suspension 7.

This smoothly carries out a process for punching out the damper 5 and attaching the punched damper 5 to the objective portion of the head suspension 7. Even in this case, the punched damper 5 involves no cracks on the constraint layer 11 so that the production yield of the head suspensions 7 is not reduced.

The punching apparatus 39 has the punching stage 33, the hollow punch 25, and the vibrational part 34. The vibrational part 34 is provided to the punching stage 33 and serves as the counter part or receiver that is opposed to the punch 25.

This reduces the size of the punching apparatus 39 that is capable of inputting the vibration to the damper material 3 and saving energy.

The vibrational part 34 has the shape corresponding to the contour shape of the punched damper 5 based on the punch 25 or the shape corresponding to both the size of the punch 25 and the width of the damper material 3.

Accordingly, the vibrational part 34 is minimized by, for example, conforming the shape of the vibrational part 34 to that of the punch 25.

The punch 25 is movable from the punching stage 33 to the objective portion of the head suspension 7 and has the extruding pin 27 that extrudes the held damper 5 from the punch 25 to attach the extruded damper 5 on the objective portion of the head suspension 7.

This structure accurately attaches the damper 5 with no cracks occurring in the constraint layer 11 punched out under the ultrasonic vibration to the objective part of the head suspension 7.

What is claimed is:

1. A method of punching out a damper from a damper material set on a punching stage with use of a hollow punch, the damper material including a viscoelastic body layer and a constraint layer laminated on the viscoelastic body layer, the viscoelastic body layer including an attaching surface through which the damper material is detachably attached on an exfoliative member, the method comprising:
   setting the exfoliative member on a supporting surface of the punching stage and on a top surface of a vibrational part that is arranged in a hole having an opening defined by the supporting surface of the punching stage, the supporting surface of the punching stage being flat and being a top surface of the punching stage, the punching stage being a block or a plate and, the supporting surface of the punching stage being flush with the top surface of the vibrational part when the vibrational part is not vibrated so that the exfoliative member contacts the supporting surface of the punching stage and the top surface of the vibrational part, the hole having an inner peripheral surface spaced from the vibrational part;
   vibrating the vibrational part at ultrasonic frequency with a vibration amplitude that is less than a thickness of the exfoliative member relative to the punching stage that is stationary while the exfoliative member contacts the supporting surface of the punching stage and the top surface of the vibrational part, hereby a part of the exfoliative member positioned on the vibrational part is vibrated by the vibrational part and a part of the exfoliative member positioned on the supporting surface of the punching stage and surrounding the part of the exfoliative member positioned on the vibrational part, is supported by the supporting surface of the punching stage;
   punching out the damper from the damper material on the vibrating part of the exfoliative member so that the punched damper is positioned within a hollow portion inside of the punch while vibrating the vibrational part at ultrasonic frequency; and
   continuing the vibrating of the vibrational part while the punched damper remains attached on the exfoliative member and is positioned within the hollow portion inside of the punch.

2. The method according to claim 1, wherein a vibration direction of the vibrational part is a direction along which the punch punches out the damper.

3. The method according to claim 1,
   wherein the vibrational part serves as a counter part that is opposed to the punch.

4. The method according to claim 1,
   wherein the punch holds the punched damper within the hollow portion inside of the punch and then extrudes the damper from the punch to attach the extruded damper to an objective portion of a head suspension.

5. The method according to claim 1, wherein a thickness of the damper material is greater than a thickness of the exfoliative member.

6. A punching apparatus configured to effect the method according to claim 1, comprising:
   the punching stage which is the block or the plate forming the flat supporting surface of the punching stage, wherein the punching stage is configured to have the exfoliative member set thereon, the damper material including the viscoelastic body layer and the constraint layer laminated on the viscoelastic body layer, the viscoelastic body layer including the attaching surface through which the damper material is detachably attached on the exfoliative member;
   the punch having a hollow portion inside it and being configured for punching out the damper from the damper material set on the exfoliative member which is on the punching stage and positioning the punched damper within the hollow portion of the punch while the punched damper remains attached to the exfoliative member;
   the vibrational part being received in a hole having an opening defined by the supporting surface of the punching stage, the vibrational part being configured as a counter part that is opposed to the punch and also being configured to vibrate at ultrasonic frequency relative to the supporting surface. of the punching stage at the time of punching out the damper, the punching stage being configured to be stationary and the supporting surface of the punching stage being configured to be flush with a top surface of the vibrational part when the vibrational part is not vibrated, the hole having an inner peripheral surface spaced from the vibrational part; and
   a drive controller configured to control the punch and the vibrational part to continue the vibrating of the vibrational part with a vibration amplitude that is less than the thickness of the exfoliative member while the punched damper remains attached on the exfoliative member and is positioned within the hollow portion inside of the punch.

7. The punching apparatus according to claim 6, wherein the vibrational part has a shape corresponding to a contour shape of the punched damper based on the punch.

8. An attaching apparatus having the punching apparatus according to claim 6,
   wherein the punch is movable from the punching stage to an objective portion of a head suspension on which the damper is attached and has an extruder that extrudes the punched damper from the hollow portion inside of the punch to attach the extruded damper on the objective portion of the head suspension.

* * * * *